United States Patent
Fletcher et al.

(10) Patent No.: US 8,813,473 B2
(45) Date of Patent: Aug. 26, 2014

(54) STEAM INJECTED GAS TURBINE ENGINE

(75) Inventors: Paul Fletcher, Rugby (GB); Andrew Charles Graham, Coventry (GB); John Moran, Nuneaton (GB); Christopher Neeson, Derby (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 13/588,646

(22) Filed: Aug. 17, 2012

(65) Prior Publication Data

US 2013/0055698 A1    Mar. 7, 2013

(30) Foreign Application Priority Data

Sep. 1, 2011    (GB) .................................. 1115043.0

(51) Int. Cl.
| | | |
|---|---|---|
| *F02C 7/00* | (2006.01) | |
| *F02C 6/18* | (2006.01) | |
| *F02C 3/30* | (2006.01) | |
| *F23R 3/28* | (2006.01) | |
| *F23L 7/00* | (2006.01) | |
| *F23R 3/04* | (2006.01) | |

(52) U.S. Cl.
CPC ........... *F02C 3/305* (2013.01); *F05D 2270/082* (2013.01); *F02C 6/18* (2013.01); *F02C 3/30* (2013.01); *F23R 3/283* (2013.01); *F23L 7/005* (2013.01); *F23R 3/04* (2013.01)
USPC ...................................................... 60/39.55

(58) Field of Classification Search
USPC .......... 60/39.54, 39.55, 39.56, 39.58, 39.182, 60/39.53
See application file for complete search history.

(56) References Cited

U.S. PATENT DOCUMENTS

| | | | | |
|---|---|---|---|---|
| 3,359,723 A | * | 12/1967 | Bohensky et al. | ............... 60/775 |
| 5,054,279 A |   | 10/1991 | Hines | |
| 7,788,897 B2 | * | 9/2010 | Campbell et al. | ............ 60/39.55 |
| 2011/0185699 A1 | * | 8/2011 | Danis et al. | .................. 60/39.55 |

FOREIGN PATENT DOCUMENTS

| | | |
|---|---|---|
| DE | 195 20 292 A1 | 12/1996 |
| EP | 1 736 707 A2 | 12/2006 |
| EP | 1 811 229 A2 | 7/2007 |
| GB | 1140757 | 1/1969 |
| GB | 2 187 273 A | 9/1987 |
| JP | A-61-149527 | 7/1986 |

OTHER PUBLICATIONS

Dec. 20, 2011 British Search Report issued in British Application No. GB1115043.0.
Apr. 30, 2014 European Search Report issued in European Application No. EP 12 18 0816.

* cited by examiner

*Primary Examiner* — Gerald L Sung
*Assistant Examiner* — Scott Walthour
(74) *Attorney, Agent, or Firm* — Oliff PLC (57) ABSTRACT

A gas turbine engine has in flow series: a compressor section, a combustion chamber, and a turbine section. The engine further has a steam generator. The combustion chamber has a steam reservoir located at the upstream end thereof. The steam reservoir receives steam from the steam generator, and delivers the received steam into a combustion zone of the combustion chamber.

10 Claims, 7 Drawing Sheets

Related Art

FIG. 1

| | |
|---|---|
| A Steam Reservoir Supply | Steam |
| B Combustor primary injection, incl. injector cooling | Fuel; Steam; Air |
| C Combustor primary dilution | Steam; Air |
| D Combustor secondary injection: deployment & cooling | Fuel; Steam; Air |
| E Turbine cooling | Steam; Air |

STEAM INJECTED GAS TURBINE ENGINE

FIELD OF THE INVENTION

The present invention relates to a gas turbine engine in which steam is injected into a combustion chamber.

BACKGROUND OF THE INVENTION

Figure 1:
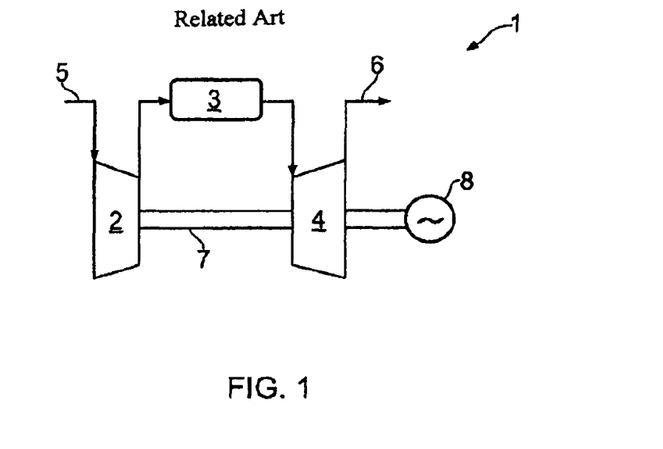
FIG. 1 shows schematically a conventional industrial gas turbine engine.

FIG. 1 shows schematically a conventional industrial gas turbine engine 1 which comprises, in flow series through the engine, a compressor section 2, a combustor 3, and a turbine section 4. The engine works in a conventional manner so that air entering an intake 5 of the engine forms a flow into the compressor section, which compresses the flow before delivering the compressed air into the combustor where it is mixed with fuel and the mixture combusted. The resultant hot combustion products then expand through and thereby drive the turbine section before being exhausted through an exhaust 6. The turbine section is mounted on a shaft or coaxial shafts 7 with the compressor section and a generator 8. Power extracted from the working gas by the turbine section drives the compressor section and the generator.

Steam injection is employed on gas turbine industrial engines to reduce NOx emissions and boost power. The specific fuel consumption of the engine can also be improved as the steam is usually raised using engine exhaust heat, e.g. in a heat recovery steam generator (HRSG). For example, as described in EP A 1905964, steam may be injected into the vicinity of the outlet of the compressor section. It may also be injected into the turbine section where it beneficially cools the turbine and can provide an additional power boost. Steam is a much more effective cooling medium than compressor delivery air, due to its higher specific heat (approximately double that of compressor delivery air), higher conductivity, and lower temperature. Injecting steam into the engine is known as an "advanced cycle".

In some gas turbine systems, steam is generated in a once through steam generator (OTSG) and used to power a steam turbine in addition to providing the steam for steam injection. The use of both a gas and steam turbine in this manner is known as a "combined cycle". An OTSG does not have the thick walls of the drums of conventional HRSGs, which generally allows start-up times to be short. The short start-up time is achieved, in part, by the ability of the OTSG to run dry i.e. without any water flowing through the tubes on the secondary side of the heat exchanger.

A basic engine, i.e. without steam injection and without combined cycle, is generally able respond rapidly to load changes, and can provide a rapid start-up. For example, a 10 minute start-up period is an industry standard for engines in the 40-100 MW class (which may be aero-derivative engines). However, such an engine does not provide the operational benefits, such as improved efficiency and reduced emissions, that can be obtained through steam injection and combined cycle.

SUMMARY OF THE INVENTION

It would be desirable to improve the flexibility of placement of steam injection in advanced cycle engines. In particular, steam injected into the vicinity of the outlet of the compressor section can make it difficult to control steam placement to the conditions required for combustion and cooling.

Accordingly, in a first aspect, the present invention provides a gas turbine engine having in flow series:

a compressor section,
a combustion chamber, and
a turbine section;
wherein the engine further has a steam generator, and the combustion chamber has a steam reservoir located at the upstream end thereof, the steam reservoir receiving steam from the steam generator, and delivering the received steam into a combustion zone of the combustion chamber.

Advantageously, the reservoir provides a means of temporarily storing steam, thereby smoothing the flow of steam to the combustion chamber. By providing the reservoir at the upstream end of the combustion chamber, the steam may be stored close to where it is to be injected, and may provide a system that can be relatively easily adjusted or reconfigured as needed to alter the position or amount of flow of steam into the combustion zone. That is, a high degree of flexibility in the location and configuration of outlet ports from the reservoir into the combustion chamber can be achieved. Further, outlets of the reservoir can help to modify the momentum of the steam. For example, the steam can be injected via a low momentum flow whereby the steam's momentum can be matched more closely to the momentum of the combustion gases in the combustion chamber, which reduces the impact of the injected steam on the fluid dynamics of the combustion process. Alternatively, the reservoir can be used to provide a more disruptive high momentum steam injection which can be used to improve mixing within and upstream of the combustion chamber.

In a second aspect, the present invention provides the combustion chamber of the gas turbine engine of the first aspect, the combustion chamber having a steam reservoir located at the upstream end thereof, the steam reservoir being adapted to receive steam from a steam generator, and delivering the received steam into a combustion zone of the combustion chamber.

Optional features of the invention will now be set out. These are applicable singly or in any combination with any aspect of the invention.

Typically, the steam reservoir has one or more inlet ports for receiving steam from the steam generator, and one or more outlet ports for delivering the received steam into the combustion zone. Conveniently, the reservoir can have fewer inlet ports than outlet ports. The reservoir can thus serve as a manifold, distributing the received steam to the outlet ports. Advantageously, this allows the number pipes carrying steam into the engine to be reduced. In particular, multiple penetrations of the casing of the combustion chamber can be avoided, such multiple penetrations giving rise to external piping congestion, and often requiring strengthening of the casing with an adverse cost implication.

The combustion chamber may have: a base plate which defines a boundary of a primary combustion zone contained within the combustion chamber, fuel being injected into the primary combustion zone at the base plate; and a cowl which covers and is spaced from the side of the base plate facing away from the primary combustion zone; wherein the steam reservoir is formed in a space between the cowl and the base plate. The cowl is typically shaped to present an aerodynamic profile to oncoming air discharged by the compressor section.

The base plate and cowl architecture is commonly used in conventional gas turbine engines. Thus the reservoir, by making use of existing architecture, does not necessarily require substantial reconfiguration of the engine.

When the steam reservoir is formed between the cowl and the base plate, an air plenum may space the steam reservoir from the base plate, the plenum receiving an airflow which cools base plate. For example, if the combustion chamber has one or more fuel injectors with respective air swirlers, the airflow can be diverted from the airflow for the air swirler(s). In this way, if steam is not received from the steam generator into the reservoir during operation (e.g. start-up), the base plate will still be cooled. One or more cross tubes may traverse the plenum, one end of the or each cross tube forming an outlet port from the steam reservoir and the other end of the or each cross tube opening to the primary combustion zone to deliver steam thereto.

Conveniently, the combustion chamber may have one or more mounting pins which mount the combustion chamber at a radially outer side thereof to the engine, and which penetrate to the steam reservoir, the or each pin containing an internal flow passage which extends between an opening at an outer end of the pin to an opening which forms an inlet port to the reservoir, whereby the steam received by the reservoir is routed thereto through the flow passage. As mounting pins are conventional mounting architecture for combustion chambers, substantial reconfiguration of the engine can once again be avoided.

The engine is usually configured to provide a turbine cooling air flow path which extends from the compressor section to the turbine section, bypassing the combustion chamber radially inwardly thereof. In this case, the or each mounting pin may traverse the reservoir and extend to the flow path, the pin having a further internal flow passage which directs a flow of steam into the flow path from an opening at the end of the further internal flow passage. Thus conveniently, the same supply (i.e. the mounting pin) can provide steam to both the combustion chamber and the turbine section.

The combustion chamber can take various forms. For example, it can be the combustion chamber of an annular combustor. Alternatively, it can be a combustion chamber of a can-type combustor having a plurality of combustion chambers with respective and discrete combustor casings. Another possibility is for it to be a combustion chamber of a cannular combustor.

When the combustion chamber is the combustion chamber of an annular combustor, the steam reservoir may be formed as an annulus which extends circumferentially around the upstream end of the combustion chamber. The reservoir can extend continuously around the annulus. Alternatively, the steam reservoir may be divided by internal walls into self-contained, circumferentially arranged, reservoir portions. Steam flow into and out of each portion can then be controlled independently of the other portions. For example, the combustion chamber typically has a plurality of circumferentially spaced fuel injectors, and each reservoir portion can then be formed around a respective fuel injector. The different reservoir portions can be controlled appropriately depending on the flame or staging statuses of their fuel injectors. Having different reservoir portions can also provide a means of mitigating rumble or compensating for local combustor liner degradation.

The reservoir may have one or more outlet ports for delivering the received steam into the combustion chamber, flow regulating arrangements being disposed at the outlet ports to regulate and reduce the pressure of the delivered steam. For example, a flow regulating arrangement may be formed by a gauze or foraminous element, or by a formation of suitably directed flow channels.

Typically, the combustion chamber has one or more fuel injectors (e.g. circumferentially spaced fuel injectors in the case of an annular combustion chamber). Each fuel injector may have a fuel nozzle and an air swirler which swirls a flow of air around fuel sprayed from the nozzle. Each fuel injector typically passes through a base plate of the type as discussed above.

Thus, for example, the combustion chamber may have one or more fuel injectors, each having a fuel nozzle and an air swirler which swirls an airflow around fuel sprayed from the nozzle, and the reservoir may have an outlet port which delivers steam into the airflow of a respective swirler. This is a convenient means for delivering steam into the primary combustion zone with a momentum matched to the momentum of fluid flow within the zone. A flow regulating arrangement as discussed above can be disposed at the outlet port. Additionally, or alternatively, the reservoir can have one or more outlet ports (with or without flow regulating arrangements) which deliver steam into a combustion zone (e.g. the primary combustion zone) of the chamber at spaced locations from such fuel injectors.

In another example, the combustion chamber may have one or more fuel injectors, each having a fuel nozzle and an air swirler which swirls an airflow around fuel sprayed from the nozzle, and the reservoir my have one or more diverter passages that allow fluid communication with the airflow directed to the swirler, the flow passages being adapted such that, when the steam reservoir receives steam from the steam generator, the steam pressure prevents the airflow entering the reservoir, but, when the steam reservoir does not receive steam from the steam generator, the airflow enters the reservoir and is delivered therefrom into the combustion chamber. This arrangement allows the reservoir to be filled with air when steam may not be available (e.g. at start up). The flow pattern out of the reservoir can thus be maintained, albeit with air, when there is no steam. Further, cooling, e.g. of a base plate of the type as discussed above, can be maintained.

Further optional features of the invention are set out below.

BRIEF DESCRIPTION OF THE DRAWINGS

Embodiments of the invention will now be described by way of example with reference to the accompanying drawings in which:

FIGS. 12 (a) and (b) show variants of respectively the first embodiment of FIG. 3 and the fourth embodiment of FIG. 10;

DETAILED DESCRIPTION AND FURTHER OPTIONAL FEATURES OF THE INVENTION

Figure 2:
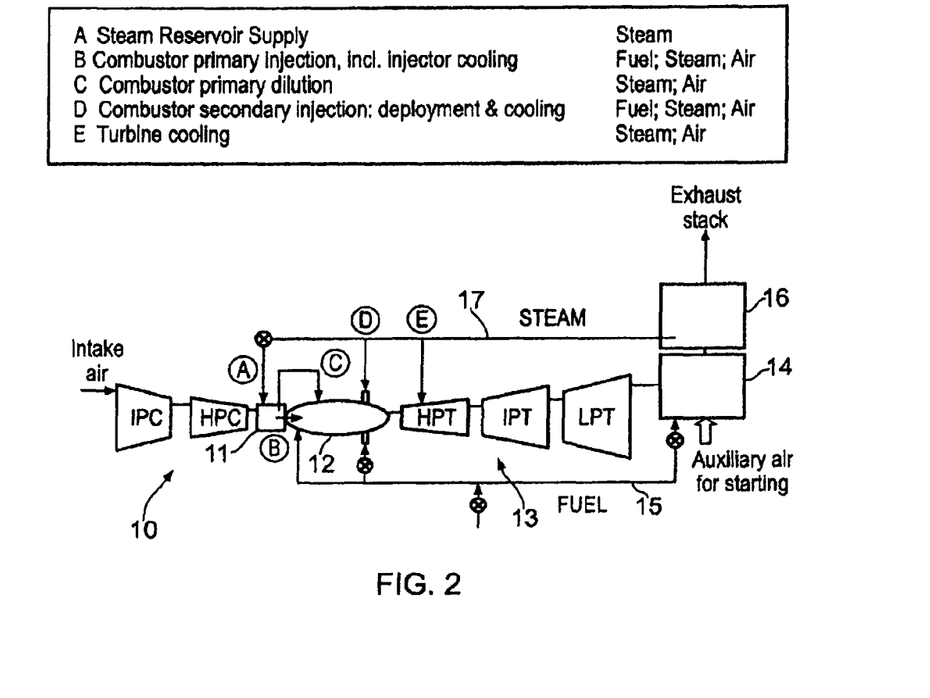
FIG. 2 shows schematically an industrial gas turbine engine according to the present invention.

FIG. 2 shows schematically an industrial gas turbine engine according to the present invention, and indicates the main feed routes for steam and fuel. The engine comprises, in flow series through the engine: a compressor section 10 comprising an intermediate pressure compressor (IPC) and a high pressure compressor (HPC); combustor comprising a steam reservoir 11 and a combustion chamber 12; a turbine section 13 comprising a high pressure turbine (HPT), an intermediate pressure turbine (IPT) and a low pressure turbine (LPT); and an exhaust duct burner 14. The IPC and IPT are connected by a shaft, and the HPC and HPT are connected by another, coaxial, shaft. The LPT drives a generator (not shown). A fuel feed 15 supplies fuel to primary and secondary injection positions of the combustion chamber. The fuel feed also supplies fuel to the exhaust duct burner. Heat is extracted from the burner by a boiler 16 and used to generate steam, which is sent to a steam feed 17. Some of the steam is delivered to the steam reservoir for subsequent injection into a primary combustion zone of the combustion chamber. Further parts of the steam are injected into a secondary combustion zone of the combustion chamber, and into the HPT for turbine cooling. The steam feed and control are regulated externally to the engine and combustor system via appropriate valving from the boiler.

To achieve power and emission benefits the engine introduces steam into key areas of the combustor and turbine for emissions and cooling purposes. This includes the primary combustion zone of the combustion chamber, where the ignition flame is held. A key feature that achieves this is the steam reservoir 11 which allows direct steam injection into the combustion primary zone, as well as providing an "in-situ" storage manifold for routing elsewhere within the combustor architecture. Adaptations to provide relatively low momentum steam flow from the reservoir can then reduce or minimise the impact of the injection on the fluid dynamics inside the combustion chamber. In particular, air can be treated as incompressible at Mach numbers of 0.3 and below—velocities which typically prevail throughout most of the combustor. At steady flow conditions of steam, the low momentum injection is defined by its velocity. Low momentum steam can be defined as steam which is injected at velocities approximately equal to that of the incompressible airflow.

Thermodynamic requirements dictate the overall mass of steam which must pass through the engine to achieve the required power and efficiency. However, these may be in excess of localised combustion limits which, if surpassed, will cause flame blowout. It is thus implicit within the design options described below that the routing of steam into the primary combustion zone adheres to these combustion limits, with the remaining steam being directed either downstream of the primary zone or into a non-combustible flow path.

Figure 3:
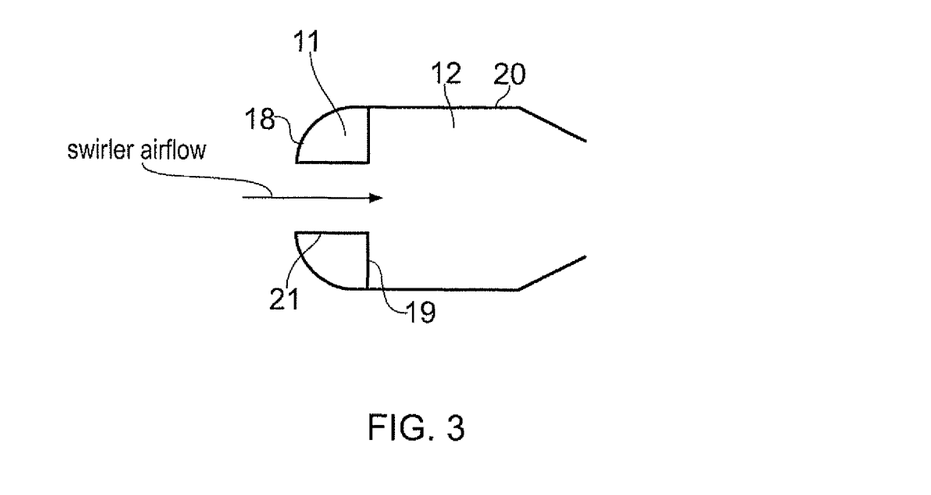
FIG. 3 shows a simplified cross-section through the steam reservoir and combustion chamber of the engine of FIG. 2.

FIG. 3 shows a simplified cross-section through the steam reservoir 11 and combustion chamber 12 according to a first embodiment. The steam reservoir is in the form of a manifold located at the head of the combustion chamber, and makes use of a gap that typically exists in conventional combustors between a combustor cowl 18 and a combustor base plate 19. The cowl extends upstream from the liner 20 which forms a wall of the combustion chamber. In conventional combustors, the cowl 18 often performs an aerodynamic flow function to reduce losses within the cooling airflow channelled around the combustor head. In the present embodiment, the cowl can retain this function as appropriate.

The steam reservoir is pressurised and configured (as discussed below) such that low momentum steam is injected into the primary combustion zone at the head of the combustion chamber adjacent the base plate where combustion occurs. A centrally-located fuel injector (omitted in FIG. 3) bridges the gap between the cowl and the base plate, and has a swirler airflow (arrowed) for producing an atomised fuel spray. The reservoir is sealed from the fuel injector airflow by a sealing cylinder 21. Alternatively, steam can be introduced into the swirler airflow, as discussed below in relation to further embodiments. Advantageously, the steam reservoir largely makes use of conventional engine architecture features, and thus can require little engine adaptation.

Figure 4:
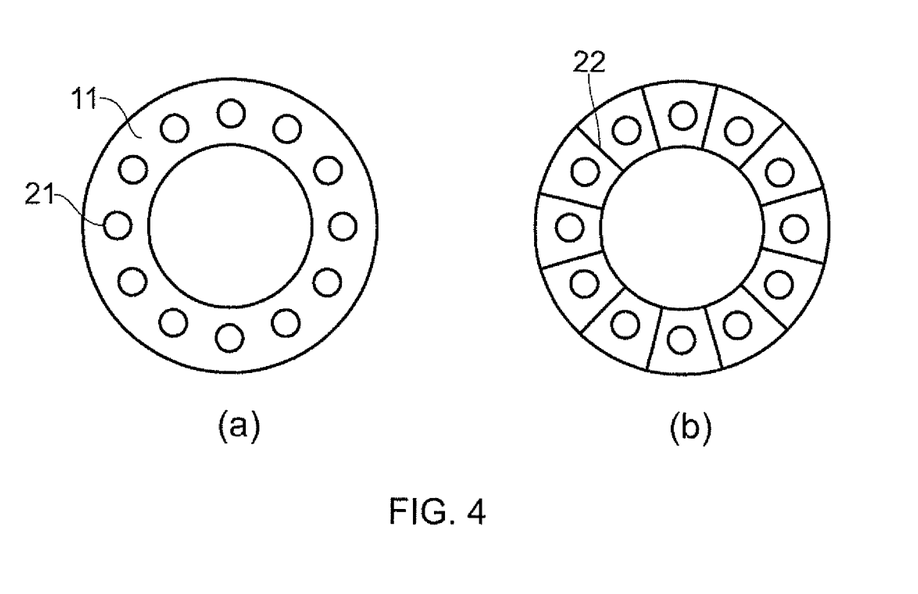
FIG. 4 shows schematically transverse cross-sections of two variants (a) and (b) of the steam reservoir.

FIG. 4 shows schematically transverse cross-sections of two variants (a) and (b) of the steam reservoir. The combustor has an annular combustion chamber, and the steam reservoir 11 is correspondingly annular in shape. Thus the reservoir can provide a store of steam "in-situ" 360° around the entire circumference of the combustor annulus. The combustion chamber has a plurality of circumferentially distributed fuel injectors and a plurality of corresponding sealing cylinders 21. In variant (a), the internal space of the reservoir extends uninterruptedly around the annulus, such that, in principle, the entire reservoir can be fed by a single steam inlet port. In variant (b), however, the internal space of the reservoir is segmented by internal walls 22 on either side of each fuel injector, thus creating a ring of smaller isolated reservoir portions within the same overall volume. Although requiring a more complicated steam control and metering system, this variant provides a further means of regulating steam flow from the reservoir into the combustion chamber, and also gives a higher steam pressure capability for positive pressure injection. For example, the steam pressure in individual portions can be "tuned" to match the conditions of the corresponding flame, giving finer NOx control and possibly a means to influence or mitigate rumble. Also, the individual portions compliment a circumferentially staged combustion system by providing selective steam injection to burners which may be on or off as required.

Figure 5:
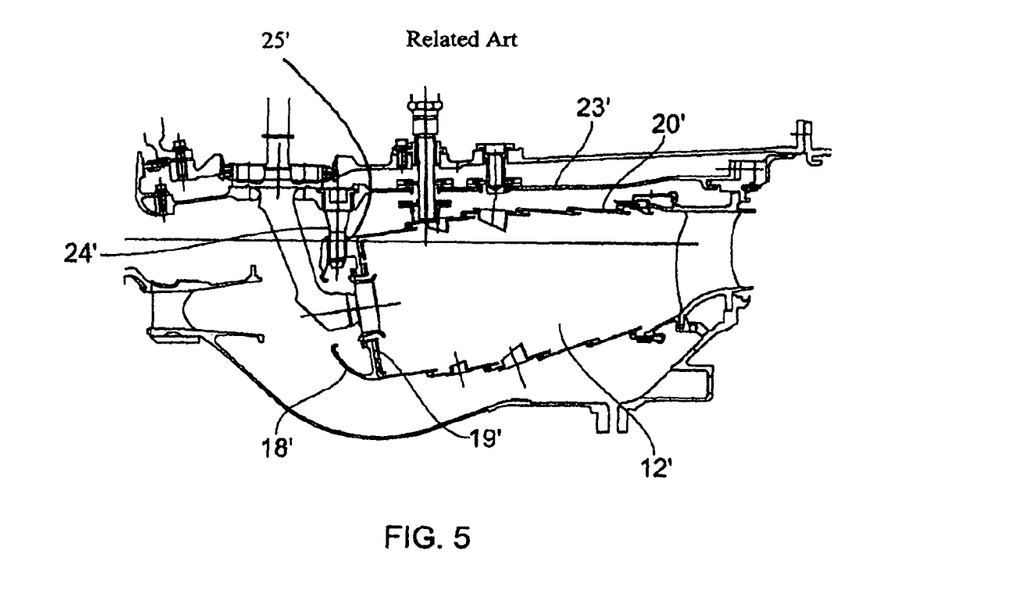
FIG. 5 shows a longitudinal cross-section through a conventional combustor.

FIG. 5 shows a longitudinal cross-section through a conventional combustor of an aero or aero-derivative engine. The combustor has a combustion chamber 12', cowl 18', base plate 19' and liner 20'. The combustion chamber is supported from a combustion casing 23' by circumferentially distributed, radially extending, mounting pins 24'. The pins fit into mounting features 25' formed in the cowl behind the base plate.

Figure 6:
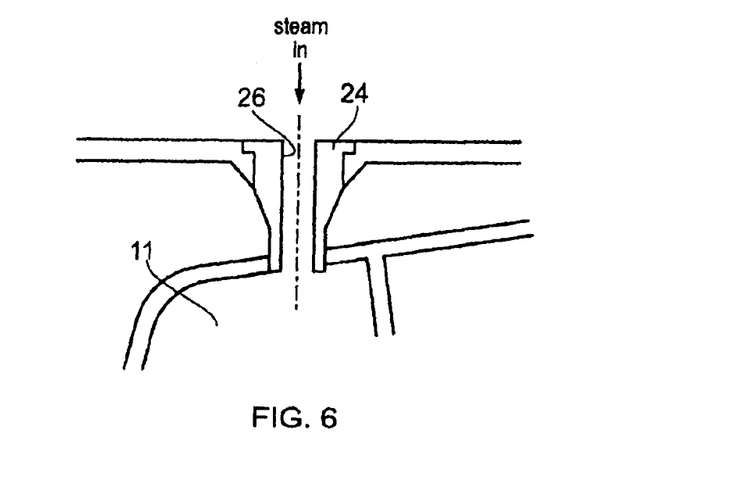
FIG. 6 is a schematic longitudinal cross-section through part of a combustor of the embodiment of FIG. 2.

As shown in FIG. 6, which is a schematic longitudinal cross-section through part of the steam reservoir and combustion chamber of the embodiment of FIG. 2, such mounting pins 24 can be used as a feed route to transfer steam from outside the engine directly into the steam reservoir 11. In particular, the pin can have an internal flow passage 26 which opens at its inner end to form an inlet port to the reservoir. The pin can be made of suitable material and/or treated appropriately in order to withstand the thermal differentials across it.

The pin therefore performs a dual function of locating the combustor with respect to the engine casing and providing a route for steam supply to the steam reservoir. Adapting mounting pins in this way reduces the need for dedicated steam supply pipes, which would increase cooling flow blockages, and require a larger casing external surface area to accommodate their mounting.

Figure 7:
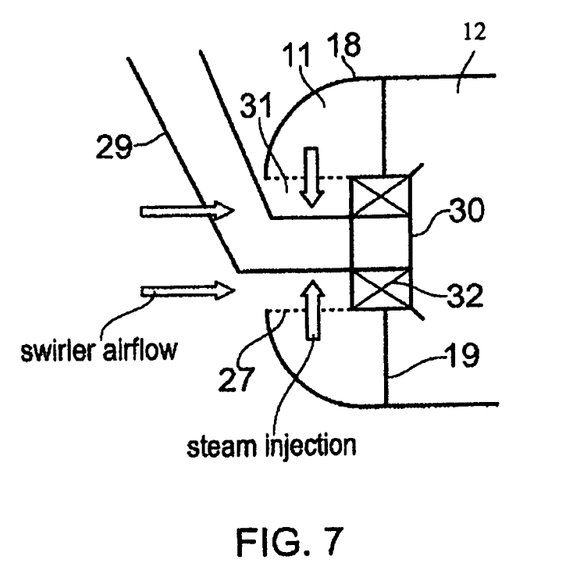
FIG. 7 shows a schematic longitudinal cross-section through the steam reservoir and adjacent part of the combustion chamber of a second embodiment.
Figure 8:
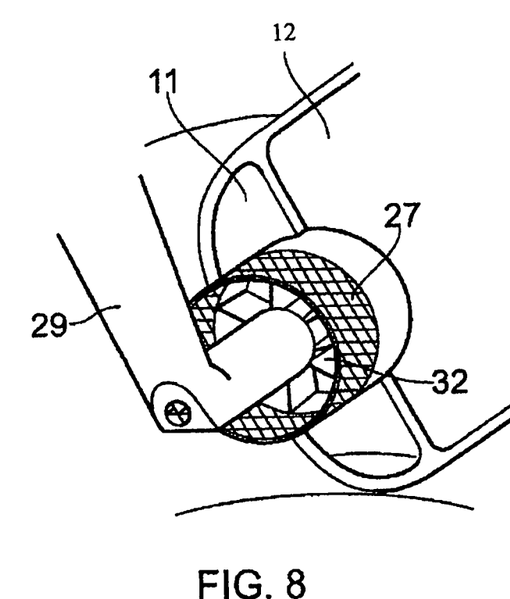
FIG. 8 shows a schematic partly cut away view of the second embodiment.

FIG. 7 shows a schematic longitudinal cross-section through the steam reservoir 11 and adjacent part of the combustion chamber 12 of a second embodiment, and FIG. 8 shows a corresponding schematic partly cut away view. The second embodiment is similar to the first embodiment except that the sealing cylinder 21 is replaced by a gauze cylinder 27 which forms a flow regulating outlet port delivering steam into the swirler airflow. More specifically, a fuel injector has a fuel line 29 extending to a fuel nozzle 30 and an annular air channel 31 surrounding the fuel line and nozzle and ending in a swirler formation 32 having swirl-inducing vanes surrounded by a cuff. The swirling air exiting the formation mixes with and atomises the fuel exiting the nozzle.

The gauze cylinder 27 extends between the cowl 18 and the base plate 19 around the outside of the air channel 31. The gauze provides a pressure drop function, facilitating and passively regulating the movement of steam into the swirler airflow from the steam reservoir 11. In variants of the type shown in FIG. 4(a), such gauze cylinders encourage an even distribution of steam around the annular reservoir, helping to ensure that all the swirler airflows receives equal supplies of steam. More generally, the fine mesh of holes within the gauze encourages a uniform distribution of steam injection around the outside of each air channel. As the entire surface of the gauze cylinder can be used for injecting steam, the amount of swirler air exposed to steam injection can also be maximised. This can improve the mixing of the steam and air flows and so serves to maximise the benefit derived from the presence of steam in the combustion process—primarily the reduction of NOx emissions.

The steam may be introduced to the airflow via a positive pressure, low momentum, injection, or more passively via entrainment where the pressure of the steam within the steam reservoir 11 is more closely matched to the pressure of the neighbouring airflow.

The swirler formation 32 and gauze cylinder 27 may be integrated into a single assembly.

Other cylindrical elements may be used in place of the gauze cylinder 27. For example, a solid cylinder piece may be fitted behind the swirler formation 32, in place of the gauze, with e.g. four holes spaced equally around the circumference to serve the same function as the holes of the gauze mesh. However, the lower number of injection points is likely to provide a less even distribution of steam injection than can be achieved with the gauze.

Figure 9:
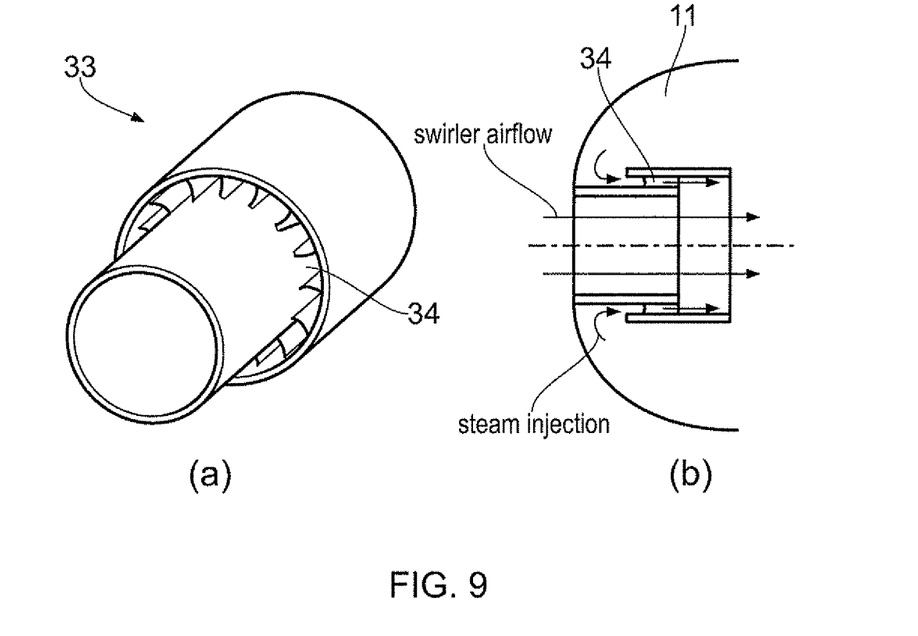
FIG. 9 shows schematically (a) a perspective view of a cylindrical element for a third embodiment, and (b) a longitudinal cross-section through the steam reservoir of the third embodiment.

FIG. 9 shows schematically (a) a perspective view of a further cylindrical element 33 for a third embodiment, and (b) a longitudinal cross-section through the steam reservoir 11 of the third embodiment. The further cylindrical element has a flow regulating arrangement in the form of a plurality of circumferentially arranged channels 34 which guide a regulated flow of steam into the swirler airflow. Low momentum steam can thus be introduced around the full circumference of the airflow, at similar velocities, with minimal or reduced disruption to the aerodynamics within the swirler.

Figure 10:
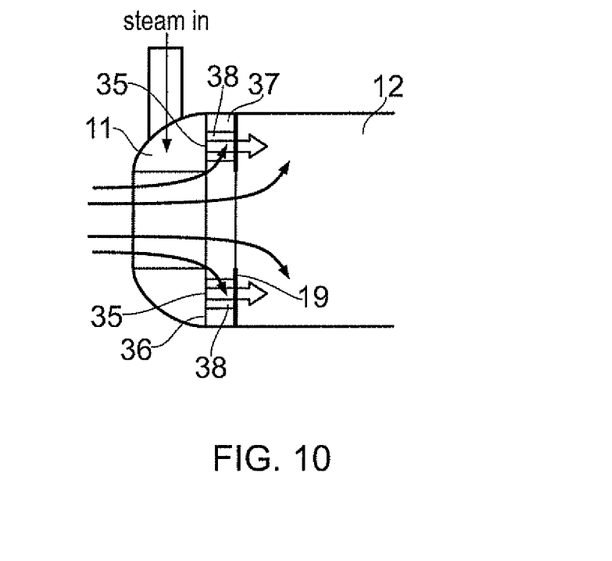
FIG. 10 shows a schematic longitudinal cross-section through the steam reservoir and adjacent part of the combustion chamber of a fourth embodiment.

In the first to third embodiments shown above in FIGS. 3, 7 and 9, steam contained in the steam reservoir 11 provides cooling to the base plate 19. However, particularly when the engine is running without steam (e.g. at start up, during dry or water operation, or due to steam supply failure) it can be advantageous or necessary to provide an alternative means for cooling the base plate. Accordingly, FIG. 10 shows a schematic longitudinal cross-section through the steam reservoir 11 and adjacent part of the combustion chamber 12 of a fourth embodiment, the fuel injector being omitted. In this embodiment, steam is injected into swirler airflow, but is also injected into the primary combustion zone via outlet ports 35 at spaced locations from the (central) fuel injector. The outlet ports can also have suitable flow regulating arrangements to regulate and reduce the pressure of the delivered steam. A separation wall 36 behind the base plate 19 spaces the steam reservoir from the base plate and creates an air plenum 37 into which a portion of the swirler air is diverted to cool the backplate. A series of cross tubes 38 extend from the reservoir at the outlet ports to bridge the plenum and inject steam exiting the reservoir at the outlet ports into the primary combustion zone. The separation wall can permit a higher steam pressure in the reservoir, allowing a greater range of possible steam mass flows and injection momentums.

Figure 11:
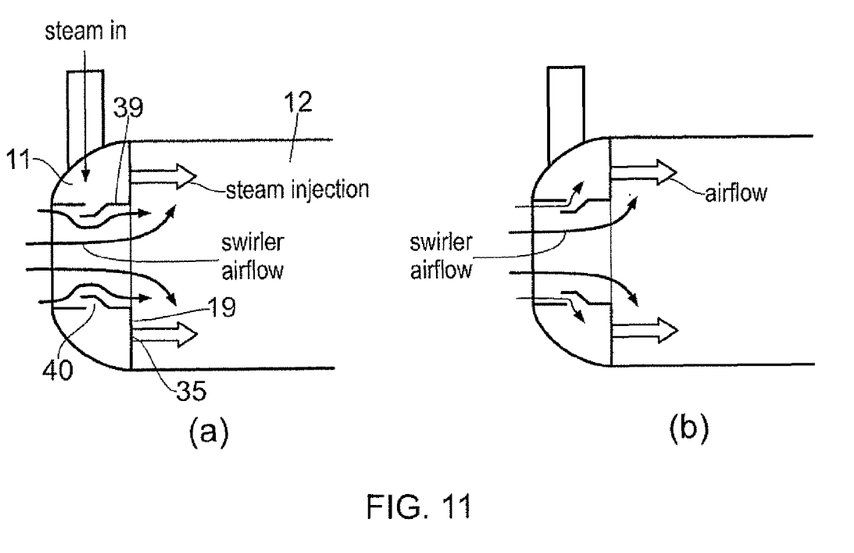
FIG. 11 shows schematic longitudinal cross-sections through the steam reservoir and adjacent part of the combustion chamber of a fifth embodiment (a) with steam and (b) without steam.

FIG. 11 shows schematic longitudinal cross-sections through the steam reservoir 11 and adjacent part of the combustion chamber 12 of a fifth embodiment (a) with steam and (b) without steam, the fuel injector being omitted. The fifth embodiment also achieves base plate 19 cooling in the absence of steam. In place of the sealing cylinder 21 of the first embodiment, a cylindrical element 39 defines the perimeter of the swirler airflow, the element having diverter passages in the form of "scoop holes" 40 which serve to divert swirler air into the steam reservoir. When the engine is running with steam, the steam pressure in the reservoir prevents swirler air entering the reservoir, and steam is injected into the primary combustion zone through outlet ports 35 at spaced locations from the fuel injector. When the engine is running without steam, swirler air is diverted into the reservoir to cool the base plate 19, and then enter the primary combustion zone through the outlet ports.

An alternative form for the outlet ports 35 in the base plate 19 is as angled effusion holes. These can increase the cooling effectiveness of the steam/air injected therethrough by increasing the length of the holes and consequently increasing the metal surface area in contact with the steam/air.

Both the fourth and the fifth embodiments provide robust systems capable of dealing with steam supply failure. However, the fifth embodiment also mimics a variable air supply geometry in that, during a dry or water-based start phase, more air is channelled through to the primary combustion zone.

Figure 12:
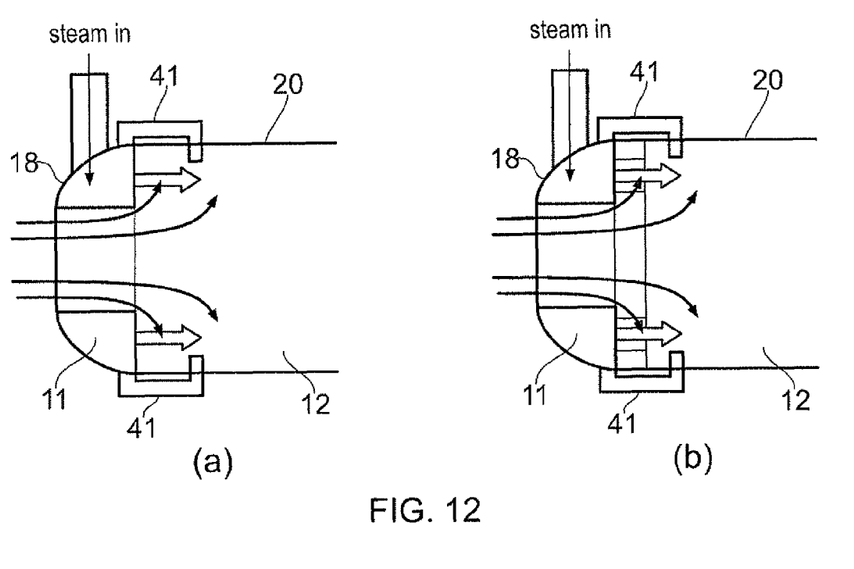

The steam reservoir provides a convenient means of storing steam close to the primary combustion zone. It may also be used in conjunction with external feeding routes, independent of the base plate, to the primary zone. This may include piping directly into the primary zone from either side of the combustion chamber. FIGS. 12 (a) and (b) show variants of respectively the first embodiment of FIG. 3 and the fourth embodiment of FIG. 10. In both variants, external feeds 41 extract steam from the steam reservoir 11 through openings in the cowl 18 and inject the steam into the primary zone through openings in the liner wall 20.

Steam may be routed from the steam reservoir and utilised for cooling purposes without the need for additional outer casing penetrations. For example, steam may be directed from the reservoir behind the baseplate and onto the inner liner wall of the combustion chamber to provide film cooling of the primary zone—in much the same way that conventional combustors direct airflows from the compressor section for this purpose.

As well as film-cooling the inner liner wall of the primary zone, steam may be directed from the steam reservoir into the external cooling airflow. This may be for the purpose of providing dilution steam and/or externally cooling the liner wall.

Figure 13:
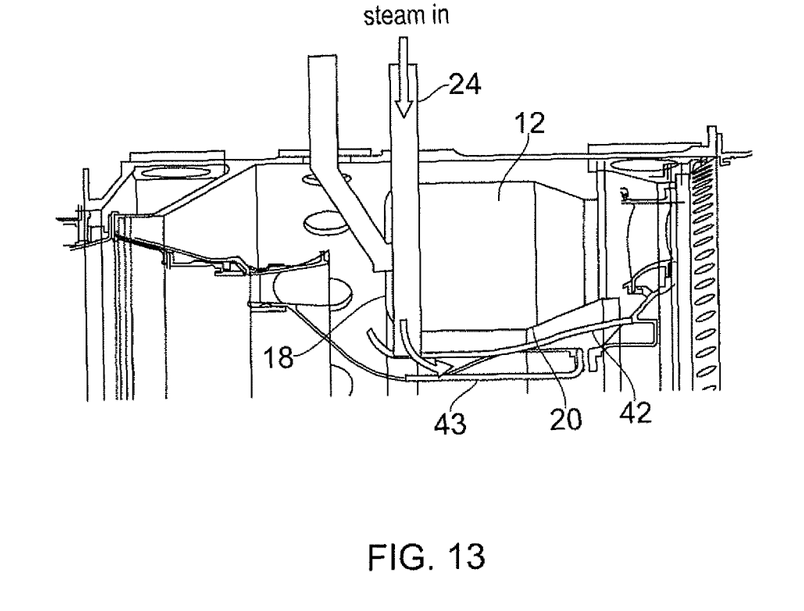
FIG. 13 is a schematic longitudinal cross-section through a combustor according to a sixth embodiment.
Figure 14:
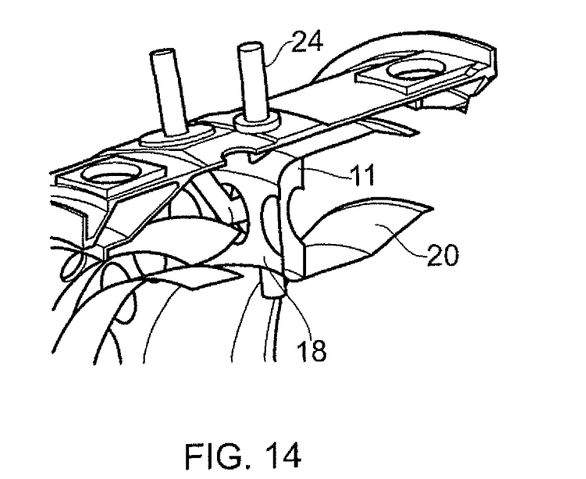
FIG. 14 is a cut away perspective view of the combustor of the sixth embodiment.

The steam may also be appropriately directed from the steam reservoir and utilised for both nozzle guide vane, and turbine section disc and blade cooling, making use of its higher specific heat capacity (and conductivity) compared with air. This is shown in respect of FIG. 13, which is a schematic longitudinal cross-section through a combustor according to a sixth embodiment, and FIG. 14, which is a cut away perspective view of the combustor of the sixth embodiment. The steam can be directed from the steam reservoir 11 to the nozzle guide vane and turbine disc and blade cooling system by the employment of a baffle 42 radially inwards of the combustion chamber 12. For example, extension of the mounting pins 24 can provide a means to bridge the gap from the inner side of the cowl 18 to a position radially inwards of the baffle, each extended pin having a further internal flow passage (not shown) which carries steam to an opening at the radially inner end of the pin. The baffle and an inner annulus member 43 then provide a flow path to guide the steam to the turbine section.

To summarise, the steam reservoir provides a means to store steam very close to the site of combustion, and, in the case of an annular combustor, 360° around the entire circumference of the annulus. Steam can be injected directly into the primary combustion zone at specific temperatures to reduce flame temperature and therefore NOx. Conventional combustor architecture can be adapted to permit the introduction of steam with relatively minor changes. The steam can be injected into the combustion chamber via low momentum flows to preserve fluid dynamics and mixing regimes as far as possible. The steam can be used as a coolant for the base plate or as a moderator for an air cooling flow. Having a central store of steam permits more simple routing to other areas of the combustor for cooling purposes, etc., while requiring relatively few (possibly only one) external feed. Mounting pins can be modified to route steam to the steam reservoir, and elsewhere within the combustor. This reduces blockage to cooling flows around the combustion chamber.

While the invention has been described in conjunction with the exemplary embodiments described above, many equivalent modifications and variations will be apparent to those skilled in the art when given this disclosure. For example, although described above in relation to an annular combustor, the concept of a steam reservoir at the upstream end of a combustion chamber can also be applied to the combustion chambers of can-type or cannular combustors. Accordingly, the exemplary embodiments of the invention set forth above are considered to be illustrative and not limiting. Various changes to the described embodiments may be made without departing from the spirit and scope of the invention.

All references referred to above are hereby incorporated by reference.

The invention claimed is:

1. A combustion chamber of a gas turbine engine, wherein the combustion chamber has:
   a steam reservoir located at the upstream end thereof, the steam reservoir being adapted to receive steam through a steam feed from a steam generator, and delivering the received steam into a combustion zone at the upstream end of the combustion chamber,
   a base plate which defines a boundary of a primary combustion zone contained within the combustion chamber, fuel being injected through a fuel feed, which is separate from the steam feed, into the primary combustion zone at the base plate, and
   a cowl which covers and is spaced from a side of the base plate facing away from the primary combustion zone;
   one or more mounting pins which mount the combustion chamber at a radially outer side thereof to the as turbine engine, and which penetrate to the steam reservoir, the or each pin containing an internal flow passage which extends between an opening at an outer end of the pin to an opening which forms an inlet port to the steam reservoir, whereby the steam received by the steam reservoir is routed thereto through the flow passage;
   wherein:
      the cowl extends upstream from and is attached to a wall of the combustion chamber; and
      the steam reservoir is defined by a space between the cowl and the base plate.

2. A gas turbine engine having in flow series:
   a compressor section;
   a combustion chamber, and
   a turbine section;
   wherein the engine further has a steam generator, and the combustion chamber has a steam reservoir located at an upstream end thereof, the steam reservoir receiving steam through a steam feed from the steam generator, and delivering the received steam into a combustion zone at the upstream end of the combustion chamber, wherein
   the combustion chamber has:
      a base plate which defines a boundary of a primary combustion zone contained within the combustion chamber, fuel being injected through a fuel feed, which is separate from the steam feed, into the primary combustion zone at the base plate, and
      a cowl which covers and is spaced from a side of the base plate facing away from the primary combustion zone;
      one or more mounting pins which mount the combustion chamber at a radially outer side thereof to the gas turbine engine, and which penetrate to the steam reservoir, the or each pin containing an internal flow passage which extends between an opening at an outer end of the pin to an opening which forms an inlet port to the steam reservoir, whereby the steam received by the steam reservoir is routed thereto through the flow passage
      wherein:
         the cowl extends upstream from and is attached to a wall of the combustion chamber; and
         the steam reservoir is defined by a space between the cowl and the base plate.

3. The gas turbine engine according to claim 2, wherein:
   an air plenum spaces the steam reservoir from the base plate, the plenum receiving an airflow which cools the base plate.

4. The gas turbine engine according to claim 3, wherein one or more cross tubes traverse the plenum, one end of the or each cross tube forming an outlet port from the steam reservoir and the other end of the or each cross tube opening to the primary combustion zone to deliver steam thereto.

5. The gas turbine engine according to claim 2, wherein:
   the gas turbine engine is configured to provide a flow path for turbine cooling air, the flow path extending from the compressor section to the turbine section, bypassing the combustion chamber radially inwardly thereof, and
   the or each pin traverses the reservoir and extends to the flow path.

6. The gas turbine engine according to claim 2, wherein the combustion chamber is the combustion chamber of an annular combustor, and the steam reservoir is formed as an annulus which extends circumferentially around the upstream end of the combustion chamber.

7. The gas turbine engine according to claim 6, wherein the steam reservoir is divided by internal walls into self-contained, circumferentially arranged, reservoir portions.

8. The gas turbine engine according to claim 2, wherein the steam reservoir has one or more outlet ports for delivering the received steam into the combustion chamber, flow regulating arrangements being disposed at the outlet ports to regulate and reduce a pressure of the delivered steam.

9. The gas turbine engine according to claim 2, wherein:
the combustion chamber has one or more fuel injectors, each having a fuel nozzle and an air swirler which swirls an airflow around fuel sprayed from the nozzle, and
the reservoir has an outlet port which delivers steam into the airflow of a respective swirler.

10. The gas turbine engine according to claim 2, wherein:
the combustion chamber has one or more fuel injectors, each having a fuel nozzle and an air swirler which swirls an airflow around fuel sprayed from the nozzle, and
the steam reservoir has one or more diverter passages that allow fluid communication with the airflow directed to the swirler, the flow passages being adapted such that, when the steam reservoir receives steam from the steam generator, a steam pressure prevents the airflow entering the steam reservoir, but, when the steam reservoir does not receive steam from the steam generator, the airflow enters the steam reservoir and is delivered therefrom into the combustion chamber.

\* \* \* \* \*